June 8, 1926.
A. M. STRICKLAND
ACCOUNT JOURNAL
Filed Sept. 1, 1922
4 Sheets-Sheet 1
1,588,279
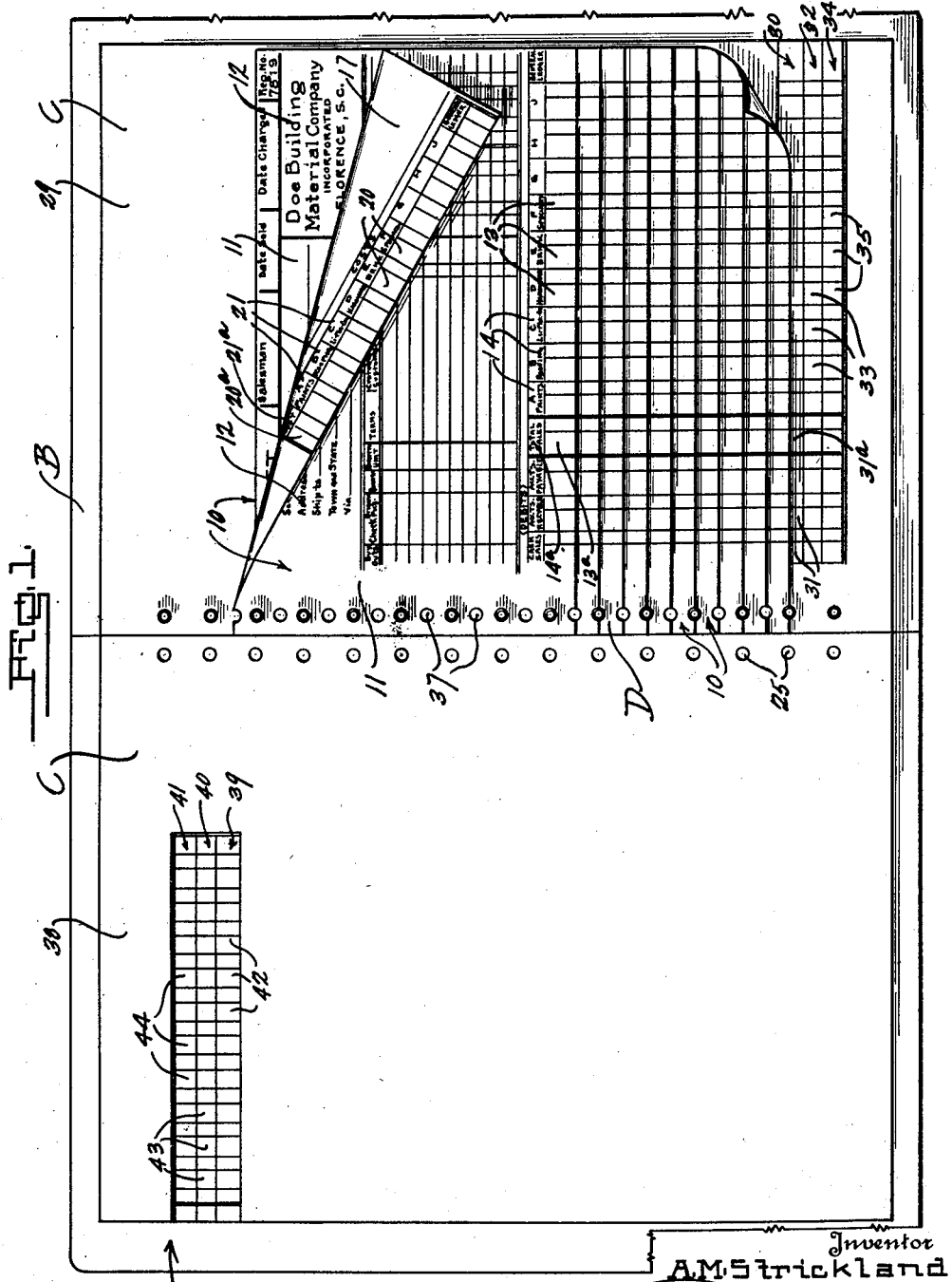

June 8, 1926.
A. M. STRICKLAND
ACCOUNT JOURNAL
Filed Sept. 1, 1922
4 Sheets-Sheet 2
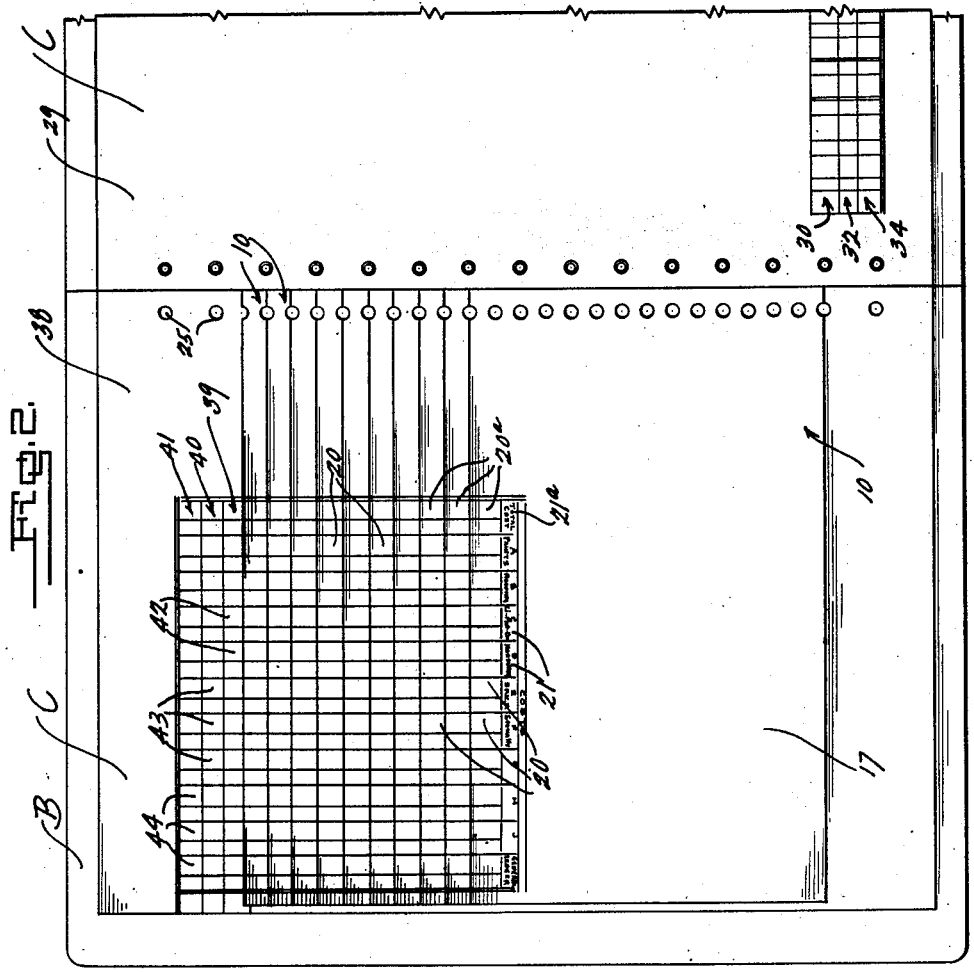
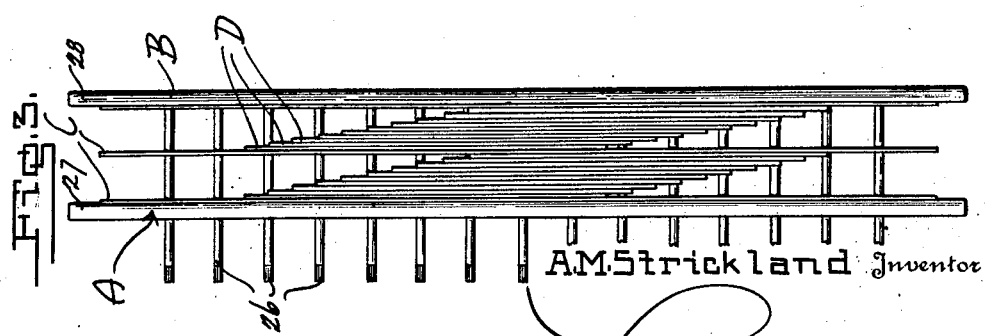
A.M.Strickland Inventor June 8, 1926.

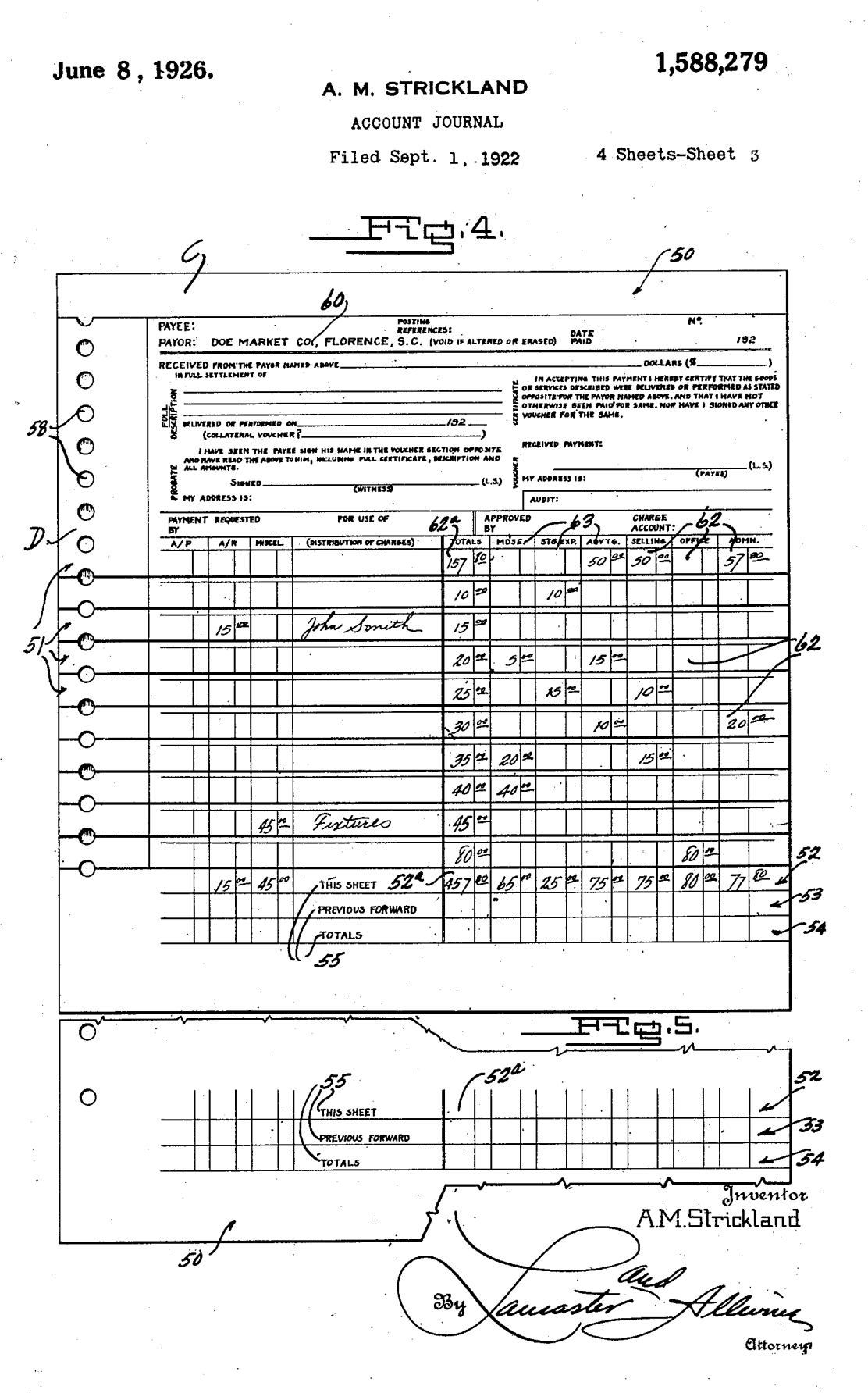

A. M. STRICKLAND

ACCOUNT JOURNAL

Filed Sept. 1, 1922

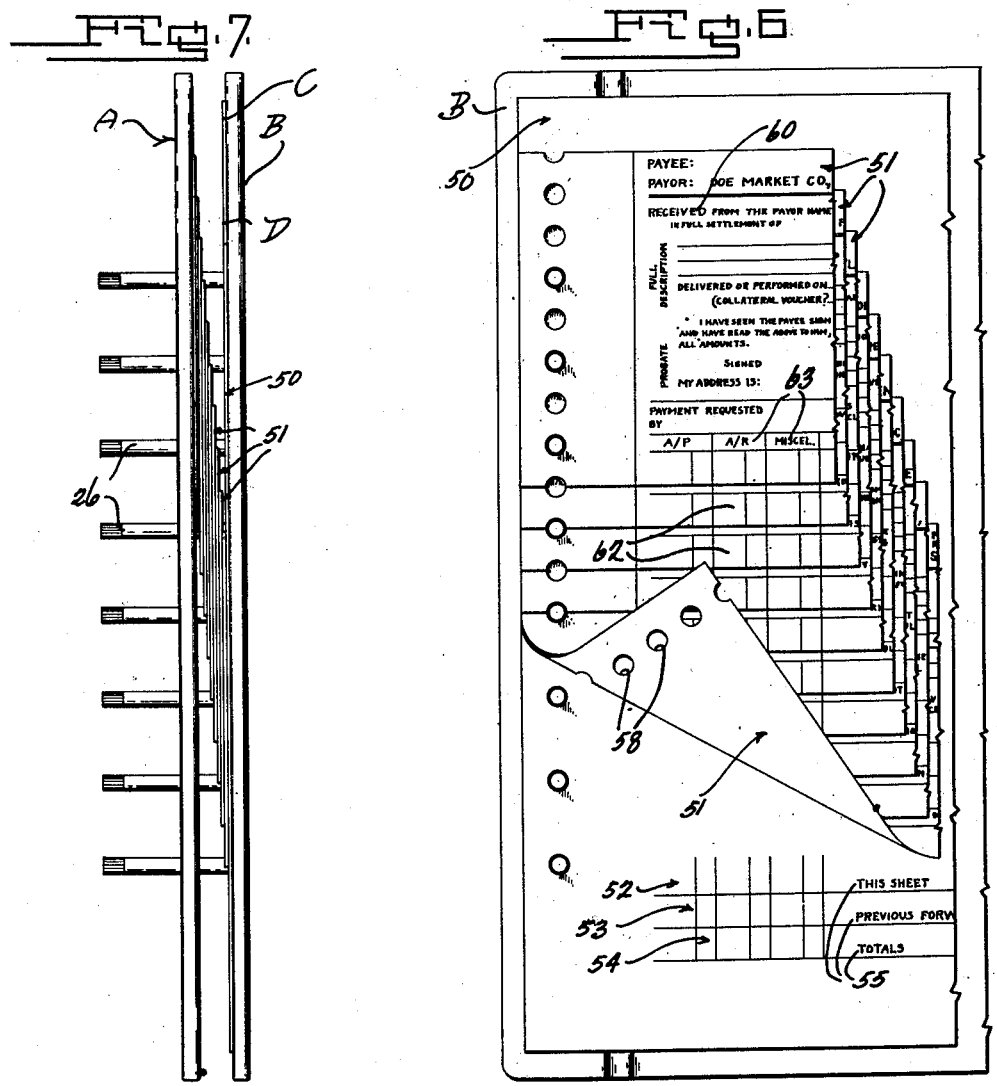

Patented June 8, 1926.

1,588,279

UNITED STATES PATENT OFFICE.

ARTHUR M. STRICKLAND, OF FLORENCE, SOUTH CAROLINA.

ACCOUNT JOURNAL.

Application filed September 1, 1922. Serial No. 585,747.

This invention relates to an improved account journal embodying means to facilitate the preparation of such accounts as sales journals, expense journals, purchase journals, cost journals and the like.

The primary object of this invention is the provision of means for accounting adapted to simplify the work of journalizing entries, and providing means for the frequent and recurring testing of the accuracy of the entries, so that a record may be continually kept "in balance" without the need of close supervision of a high order, so that inexpensive clerical assistance may readily and accurately perform account work, which has heretofore required the services of experienced bookkeepers.

A further object of the invention is the provision of an account journal of a permanent character containing records of all work performed, and by means of which any part or the whole of a record may be conveniently and readily verified or audited without the necessity of making or referring to separate adding machine tapes or other disjointed and unrelated data.

A further object of the invention is the provision of an improved account journal utilizing original entries or vouchers, assembling them in such relation as to each form a constituent part of the accountant's record, and thereby eliminate much of the intermediate copying and posting of entries with attendant possibilities of error.

A further object of this invention is the provision of a compact account journal which may embody a plurality of account vouchers containing co-related data upon both sides thereof, said journal embodying means for arranging said vouchers in stepped relation, so that consolidated and co-related records are produced upon opposite sides of the vouchers.

A further object of this invention is the provision of an account journal of the above mentioned character, which embodies master sheets having total entry spaces thereon, and voucher sheets of a particular class associated with these master sheets and arranged in novel superposed stepped relation, each of the series of sheets having spaces adapted for exposed relative positioning with the total entry spaces of the master sheets, and thus providing an accounting arrangement by means of which a person may conveniently and readily determine the total of all master sheets; the total of a current master sheet; or the total of all of the superposed voucher sheets in a current period.

A further object of the invention is the provision of an accounting journal of the above described character which may be used in connection with the accounting matters of public service corporations; wholesale business houses; large department stores; and other business places transacting business which requires voluminous account records.

Other objects and advantages of this invention will be apparent during the course of the following detailed description.

In the accompanying drawings, forming a part of this specification, and wherein similar reference characters designate corresponding parts throughout the several views, Figure 1 is a plan view of an open account journal, showing co-related master and voucher sheets.

Figure 2 is a fragmentary plan view of the account journal illustrated in Figure 1, showing the reverse sides of the master and voucher sheets illustrated in Figure 1, the reverse sides containing data pertinent to cost of sales and consequently which is co-related to the matter as illustrated in Figure 1.

Figure 3 is a side elevation of the improved account journal, showing the manner in which the record sheets thereof are assembled within a loose leaf binder.

Figure 4 is a plan view of an account journal which, in fact, is an expense journal and embodies a plurality of disbursing vouchers and a master sheet cooperatively disposed with respect thereto.

Figure 5 is a fragmentary plan view of a portion of a master sheet embodied in this invention, showing the total entry spaces provided thereon in column formation.

Figure 6 is a fragmentary plan view of the details illustrated in Figure 4, however, more clearly designating the relation of the disbursing vouchers and master sheet as used therewith.

Figure 7 is a side elevation of the expense journal as illustrated in Figure 4, showing the same assembled within a loose leaf binder.

In the drawings, wherein for the purpose of illustration are shown but the preferred embodiments of this invention, the letter A designates the improved account journal, which may embody a binder B; master sheets C; and voucher sheets D.

The word "voucher" as used in connection with the improved account journal, means a receipt for money materials or labor; a sales invoice; a purchase invoice or order; or any original document or copy thereof which evidences or vouches for an entry in bookkeeping.

Referring to the embodiment of the improved account journal as used in connection with the invoice of sales and cost of sales, and as illustrated in Figures 1, 2, and 3 of the drawings, the voucher sheets D thereof may be specifically designated by numeral 10. One face 11 of each voucher sheet 10 may contain data 12 pertinent to the vendor and vendee, and include the terms and other data relative to the transaction for which the voucher was issued. The novelty upon the face 11 of each voucher sheet 10, however, consists in the provision of a plurality of entry spaces 13, which may be disposed adjacent a marginal edge of the voucher sheet, such as the lower horizontal edge as is illustrated in Figure 1 of the drawings. Each of the entry spaces 13 may be determined by means of indicia 14 designating controlling accounts or similar data. The entry or distribution spaces 13 are, of course, adapted to receive numerals or similar delineations indicative of the transactions evidenced by the particular voucher sheet upon which the same occur and, of course, being positioned with regard to the accounts 14.

In the example illustrated in Figures 1, 2 and 3 in which the faces 11 of each voucher sheet 10 contain matter pertinent to an invoice of sales, the account for a building material company may designate paints, roofing, lumber, hardware and other data. The sale prices of these articles are of course listed in the entry spaces 13. An entry space 13$^a$ is preferably provided, which as is indicated at 14$^a$ is utilized for summing up the total sales appearing upon the side 11 of each voucher sheet 10.

Referring to the reverse face 17 of each of the voucher sheets 10, the same, upon the marginal portion thereof which is directly opposite to that marginal portion upon which the distribution spaces 13 occur, is provided with a plurality of entry or distribution spaces 20 which may be designated by the indicia 21, designating controlling accounts which are similar to the indicia 14 appearing upon the face 11 of the voucher 10. This indicia 21, as well as other printed matter upon the face 17 of the voucher sheet 10, is inverted with respect to the printed matter upon the face 11 of each voucher sheet 10, as is indicated in Figures 1 and 2 of the drawings. All printed matter upon the face 17, however, is in reference to the cost of sales which have been made as indicated upon the face 11 of each sheet 10.

A total cost entry space 20$^a$ is provided upon each voucher sheet, which may be designated by indicia 21$^a$, so that the total cost of all of the materials as listed in the cost entry spacing 20 may be entered on the face 17 of each voucher sheet 10. It is to be noted that the vertical and horizontal rulings by means of which the entry spacings 13 and 20 are provided, are such that when the upper marginal portion of each voucher sheet 10 is overfolded, the entry spacings 20 and 13 may be properly aligned in order to determine the cost price and sales price of each item or account.

Referring to the means of assemblage of the voucher sheets 10, for a current period, the same are disposed in a superposed stepped relation, as is indicated in Figures 1, 2, and 3 of the drawings. The master sheets C are provided with perforations 25 adjacent a vertical marginal edge thereof, whereby the same may be detachably positioned over the retaining posts 26, intermediate the covers 27 and 28 of the binder B. These master sheets C are relatively large, and so positioned within the binder B that a plurality of the voucher sheets D are arranged between the master sheets C in superposed stepped relation.

Referring to the arrangement as is illustrated in Figure 1, the face 29 of the master sheet C upon which the vouchers 10 are shown in superposed stepped relation, is preferably provided with a row 30 of entry spaces 31 upon the lower portion thereof; a row 32 of entry spaces 33; and a row 34 of entry spaces 35.

These rows 30, 32 and 34 are preferably arranged in adjacent horizontal manner upon the lower portion of the master sheet side 29, with the row 30 uppermost and the row 34 lowermost. The entry spaces 31, 33 and 35 of these rows, however, are in column formation. Referring to the relation of the vouchers 10 with the entry spaces upon the face 29 of a master sheet C, the lowermost voucher sheet 10 is attached to the binder posts 26, as by insertion through perforations 37, which are provided in a vertical marginal portion of each voucher sheet 10, so that the entry spaces 13 and 13$^a$ of this lowermost voucher sheet align with the entry spaces 31, 33 and 35 of the master sheet C. The vouchers, as they are placed in the binder B, are disposed in stepped relation with the voucher sheets already in the binder, so that the uppermost voucher sheet 10 is the only one which has the controlling account indicia 14 and the other printed matter 12 visible. However, the footing or entry spaces 13 and 13$^a$ of all of the voucher sheets 10 are exposed and arranged in vertical column formation according to the items or transactions designated by the indicia 14 and 14ᵃ.

When all of the vouchers 10 have been disposed for superposed stepped relation, which completes an account journal for a master sheet, the totals for that series of voucher sheets for the controlling accounts 14 may be entered in the spaces 31 of the row 30. Of course, an entry space 31ᵃ in each row 30 is provided for receiving the totals of all of the voucher sheets 10 for a current period. The spaces 33 in the row 32 are adapted for containing totals forwarded from previous master sheets C, which may be disposed in the binder B, or carried forward from other binders; and the grand total of everything listed in the spaces 35 provided in the lowermost row 34. By this arrangement, it can readily be seen that the totals of all of the voucher sheets 10 for a current period, and other data pertinent to the grand totaling of previous business may be obtained.

Since the voucher sheets 10 are of substantially the same size and particularly of the same length, it can readily be understood that the vouchers will be relatively stepped when the same are turned as to expose the faces 17, so that the entry spaces 20 and 20ᵃ upon the voucher faces 17 will likewise be arranged in column formation with the voucher 10 which was first disposed as a record upon the master sheet C being the only one which has the controlling account indicia 21 and 21ᵃ exposed. As is indicated in Figure 2 of the drawings, the voucher sheets 10 have been turned from the position illustrated in Figure 1 of the drawings, whereby the reverse faces 17 of said voucher 10 are exposed. They are illustrated in Figure 2 in inverted position and by swinging the binder D around, the clerk may readily see the cost entries for each of the voucher sheets 10, which are arranged in vertical column formation, according to the indicia 21 and 21ᵃ. The other face 38 of each master sheet C is preferably provided with rows 39, 40 and 41 of entry spaces 42, 43, and 44 respectively. These rows 39, 40 and 41 are respectively provided for receiving current totals, previously listed totals, and grand totals, altogether similar to the rows 30, 32 and 34 provided upon the opposite faces 39 of the master sheet C. However, these rows 39, 40, and 41 are respectively provided for cooperation with the columns of the vouchers 10 as provided by the cost spaces 20.

Referring to the embodiment of this invention as illustrated in Figures 4, 5, 6 and 7 wherein an expense or disbursing journal is shown, the master sheet C may be specifically indicated by numeral 50, and each of the voucher sheets D specifically indicated by numeral 51. The master sheet 50 is preferably provided with rows 52, 53 and 54 of entry spaces, the entry spaces in these rows being arranged in column formation, and the rows horizontally arranged adjacent the lower portion of the sheet. Indicia 55 may be provided for designation of the rows 52, 53 and 54.

Each of the voucher sheets 51 is preferably in the form of a receipt, and may be original paper. These sheets 51 are all preferably of the same dimensions, and each include a series of perforations 58 adjacent the marginal edge thereof for receiving the prongs of the binder B, as has been heretofore mentioned. Each voucher sheet 51 is preferably provided with printed data 60 upon the face thereof, pertinent to the character of the paper; the name of the parties; and the terms and conditions of the transaction which it might represent. Each of these voucher sheets 51 is provided adjacent its lower marginal edge with a plurality of entry spaces 62 which are designated by indicia 63, which may represent controlling accounts and the like. An entry space 62ᵃ is also provided on each voucher sheet for recording the total of the amounts appearing in the entry spaces 62 of that sheet. The vouchers 51 are arranged in the binder B substantially in the manner above described, and positioned in superposed stepped relation so that the topmost voucher 51, is the only voucher which has the printed matter 60 and the indicia 63 exposed; the spaces 62 and 62ᵃ of the vouchers 51, however, being arranged in column formation and exposed for the determination of the total disbursement of each account 63. The columns represented by these entry spaces 62 and 62ᵃ are arranged in aligning relation with the columns of the master sheet rows 52, 53 and 54, substantially as is illustrated in Figure 4 of the drawings.

In the example indicated in Figure 4, the total of each of the columns designated by the indicia 63 is listed in an entry space provided in the master sheet row 52; the entry space 52ᵃ immediately beneath the column of the voucher sheet entry spaces 62ᵃ being provided for receiving the total of the amounts as indicated in the spaces 62ᵃ, so that a total for the current period as designated by the vouchers 51 may be obtained. A check upon the total in the space 52ᵃ may be had by cross adding the totals in the remaining entry spaces of the row 52. The row of the entry spaces 53, of course, is provided for receiving the aggregate sums of preceding master sheets, and the row 54 receives the grand totals, as has hereinbefore been indicated. In this manner, the current master sheet will show the total of all business in a current period to the latest voucher filed, and being completely proven and posted to date, so that consolidated closing of an account may be quickly and easily obtained.

From the foregoing description of this invention it can be seen that a relatively simple and concise accounting journal has been provided, which may utilize original receipts, bills, and like paper in the making up of the final account, without the necessity of complicated bookkeeping. The improved account journal may be used in connection with all classes of business.

It is to be distinctly understood that various changes in the shape, size, and arrangement of parts of this invention may be made to the forms illustrated and described, without departing from the spirit of the invention or the scope of the claims.

I claim:

1. In a device of the class described, the combination of a master sheet having appropriately designated total receiving entry spaces thereon, and a plurality of voucher sheets of the same size, each having a plurality of distribution spaces arranged along the marginal edge therof appropriately designated by various account transactions and including an appropriately designated pace for receiving a total of all transactions, said sheets being disposed in superposed relation with each having its lower edge in spaced relation above the lower edge of the sheet beneath it whereby the distribution spaces are exposed and cooperating to provide vertical columns, like transactions of different sheets being arranged in the same column and the totals of each voucher being arranged in alignment, each of the columns provided by the arrangement of the respective entry spaces of the voucher sheets having a total receiving entry space upon the master sheet aligning therewith.

2. An account journal comprising a plurality of voucher sheets having appropriately designated entry spaces on both faces thereof, means for maintaining said sheets in stepped relation at opposite faces whereby like designated entry spaces of similar faces of the sheets are arranged in exposed columnar formation, and master sheets for each of the similarly arranged faces of said voucher sheets having total entry spaces thereon for recording the totals in the entry spaces of said voucher sheets.

3. An account journal comprising a plurality of voucher sheets having entry spaces on both faces thereof designated by co-related delineations, means maintaining said sheets in association so that similarly designated entry spaces of similar faces are arranged in alignment, and master sheets for associating with each of the similarly arranged faces of said voucher sheets having entry spaces thereon for recording of the totals as indicated in the aligning entry spaces of said voucher sheets.

4. An account book comprising a pair of master sheets, and a plurality of superposed voucher sheets having appropriately designated entry spaces on both faces thereof and arranged in stepped relation intermediate said master sheets whereby the entry spaces on the faces adjacent opposite edges of each of said voucher sheets are exposed, similarly designated entry spaces on similar faces of said sheets forming columns, each of said master sheets having total receiving entry spaces for association with the columns of said voucher sheets.

5. An account journal comprising a plurality of master sheets each provided upon the upper portion thereof with total receiving entry spaces and upon the lower portion of the other face thereof with total receiving entry spaces, and a plurality of superposed voucher sheets each having appropriately designated entry spaces on both faces thereof adapted for containing co-related matter, said entry spaces being arranged in inverted relation upon opposite faces thereof, the voucher sheets adapted for disposition intermediate adjacent master sheets in stepped relation whereby the entry spaces upon opposite edge portions of said voucher sheets are disposed and arranged in column formation, said columns of entry spaces on the similar faces of the voucher sheets having total receiving entry spaces on a face of one master sheet aligning therewith, and the columns provided by the entry spaces upon the opposite faces of said voucher sheets adapted for alignment with the total receiving entry spaces upon a face of another master sheet.

6. In a journal a series of original entry sheets each of which at the opposite faces thereof have appropriately designated spaces which read in opposite directions, and means arranging said sheets so that they are disposed in stepped relation in opposite directions at opposite faces of said sheets to expose said designated spaces in column arrangement at each side of the series of sheets whereby they read in opposite directions.

7. In a journal a series of original entry sheets each of which at the opposite faces thereof have appropriately designated spaces which read in opposite directions, and means arranging said sheets so that they are disposed in stepped relation in opposite directions at opposite faces of said sheets to expose said designated spaces in column arrangement at each side of the series of sheets, and a master sheet at each of the sides of said series disposed in stepped relation with the sheets of said series and provided with appropriately designated grand totaling spaces arranged in exposed aligning relation with the exposed spaces at their respective sides of said series of sheets.

8. As an article of manufacture a voucher sheet having a series of appropriately designated spaces on one face thereof, and a co-related series of appropriately designated entry spaces on the opposite face thereof and in an inverted and respective aligning relation with the first mentioned entry spaces so that when the sheet is bent over upon itself and between the opposite edges the co-related spaces of both faces will be disposed in an exposed readable aligning relation to compare the related entries.

9. As an article of manufacture a voucher sheet having a series of appropriately designated cost entry spaces on one face thereof, and a co-related series of appropriately designated sales entry spaces on the opposite face thereof and disposed in an inverted and respective aligning relation with the said cost entry spaces and whereby when the sheet is bent over upon itself between the opposite edges thereof the co-related cost and sales entries of each item designated will be disposed in an exposed accurate aligning relation to compare the cost and sale prices of particular items.

10. An account journal comprising a pair of master sheets having footing spaces thereon, and a series of sheets of substantially the same length and width affixed in stepped superposed relation between said pair of master sheets so that the lower edge of each sheet is spaced above the lower edge of the sheet beneath it and with its upper edge extended beyond the upper edge of the sheet beneath it, each of said series of sheets having appropriately designated entry spaces on each face thereof and with the entry spaces of one face inverted with respect to the entry spaces on the other, whereby when the series of sheets are assembled as above mentioned the exposed stepped face portions of said sheets at each side of said series will have the appropriately designated spaces disposed in aligning relation and in co-operative relation with the footing spaces of said master sheets.

11. As an article of manufacture a voucher sheet having a series of appropriately designated cost entry spaces on one face thereof, and a co-related series of appropriately designated sales entry spaces on the other face thereof in vertically aligning relation directly with the respective cost entry spaces of the first mentioned face of said sheet, whereby when the sheet is bent over upon itself and between the opposite edges the co-related cost entry spaces of one face will be disposed in aligning relation with the respective sale entry spaces of the opposite face to compare the related entries.

12. As an article of manufacture a voucher sheet having a series of entry spaces on one face thereof appropriately designated and arranged adjacent one marginal edge of the sheet, and a co-related series of appropriately designated entry spaces on the opposite face of the sheet inverted and arranged adjacent to an opposite marginal edge of the sheet with respect to the placement of the entry spaces on the first mentioned face of the sheet, whereby when the sheet is bent over upon itself and between the said opposite marginal edges thereof the co-related spaces of both faces will be disposed in an exposed aligning relation readable in one direction to compare the related entries therein.

13. In a journal of the class described a master sheet having total receiving entry spaces thereon, and a plurality of original entry sheets of the same size, having a plurality of appropriately designated entry spaces arranged, along a marginal edge thereof, said spaces being similarly arranged in like position for like items on each sheet, said sheets being disposed in superposed vertical stepped relation with each sheet having its lower edge in spaced relation about the lower edge of the sheet beneath it whereby like transactions of different sheets are arranged in vertical columns, each of the columns provided by the entry spaces of the original sheets having a total receiving entry space upon the master sheet aligning therewith.

ARTHUR M. STRICKLAND.